Jan. 9, 1962

H. N. EKLUND 3,015,956

INSTRUMENT FOR MEASURING DISPLACEMENT OF A BODY

Filed Jan. 31, 1957

INVENTOR.
HARRY N. EKLUND,
BY
Jerry E. Turner
AGENT.

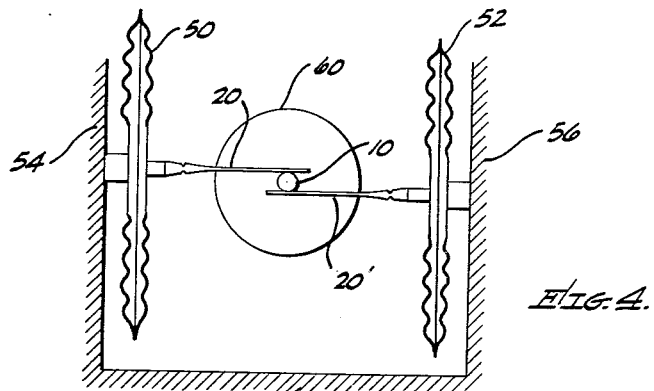
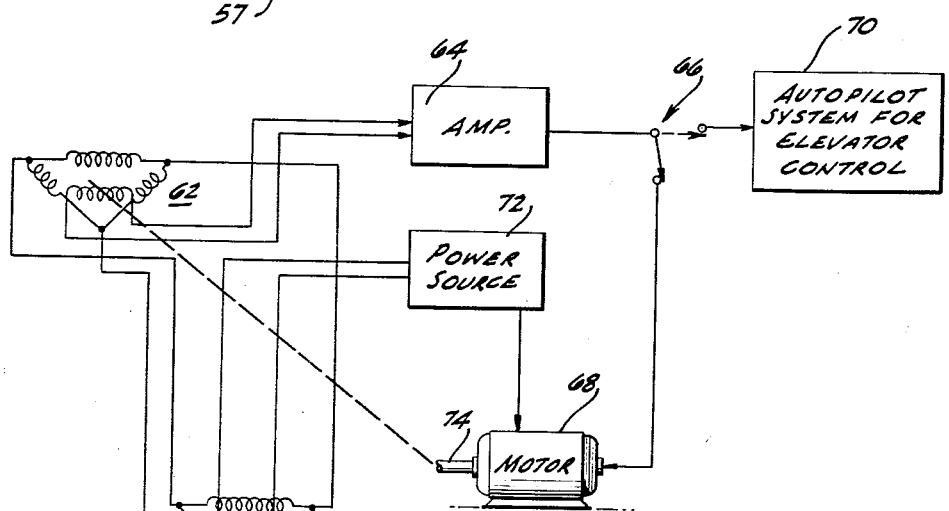
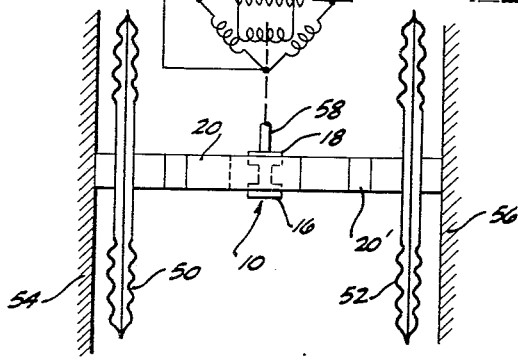

United States Patent Office 3,015,956
Patented Jan. 9, 1962

3,015,956
INSTRUMENT FOR MEASURING DISPLACEMENT OF A BODY
Harry N. Eklund, Pacific Palisades, Calif., assignor to Lear, Incorporated
Filed Jan. 31, 1957, Ser. No. 637,403
4 Claims. (Cl. 73—386)

This invention relates to mechanical indicators, and more particularly to means for converting rectilinear motions of a movable or vibratory body into rotary motion to obtain significant indications of such motions.

It is desirable in many instances to provide a highly accurate mechanical means for indicating the movement of a structure. One example is found in an altitude transducer for aircraft, wherein evacuated capsules or bellows expand and contract in response to changes in air pressure with altitude. In connection with an altitude transducer, it is often desired to control the aircraft automatically so as to maintain flight at a constant altitude, and the operation of the transducer must be utilized to develop electrical control signals for this purpose. Another example is found in the use of delicate instruments mounted on a supporting structure which undergoes vibratory movement. Suitable mechanical indicating means is desired to provide data from which to determine the position for the structure at which minimum vibration occurs. Whatever the use, it is of utmost importance that the indicating or sensing means be accurate, and hence there should be no backlash.

It is an object of this invention to provide improved altitude transducer means for developing electrical indications of changes in air pressure.

It is another object of this invention to provide for an altitude transducer, improved means to convert rectilinear motion of pressure-sensitive apparatus to rotary motion suitable to detect altitude changes of only a few feet.

It is also a purpose of this inventtion to provide a mechanism including magnetic elements for converting rectilinear motion of a structure into rotary motion.

Still another object of this invention is to provide a friction drive of the rack and pinion type in which the contacting portions of the surfaces are held together under the influence of magnetic forces.

In one embodiment of this invention a permanent magnet shaft is located between the ends of a pair of oppositely extending blade springs of soft magnetic iron. The ends of the blade springs are fixed to respective pressure-sensing bellows which expand and contract in unison during changes in air pressure. The shaft attracts and holds the blades to it, whereupon the shaft rotates in response to longitudinal motion of the blades. The shaft is adapted to rotate a member to develop electrical signals representing the movement of the bellows and therefore the altitude at which the bellows are located.

The above and other objects and advantages of this invention will be apparent from the following description, taken in conjunction with the accompanying drawings, in which different embodiments of the invention are illustrated by way of example. The scope of the invention is pointed out in the appended claims.

In the drawings,

FIGS. 4 and 5 are respective front elevation and plan views of an improved altitude transducer apparatus, also in accordance with this invention.

Figure 1:
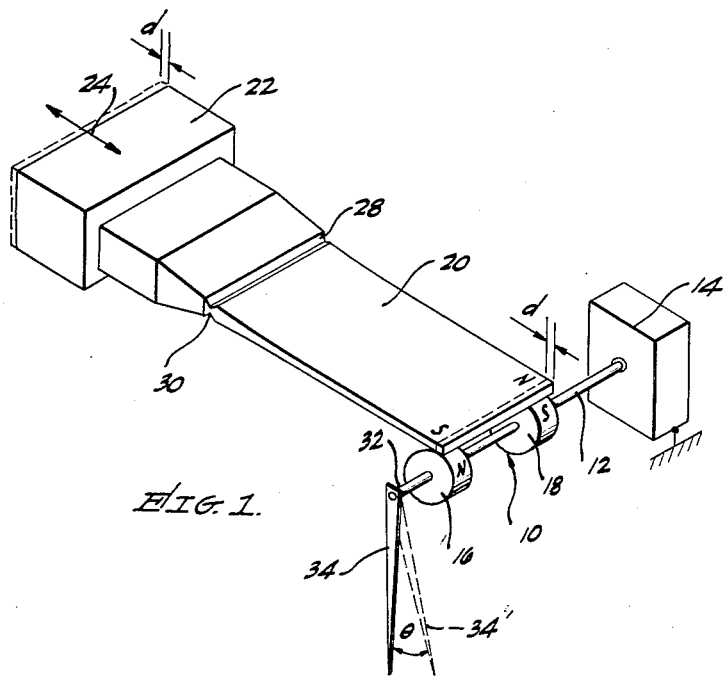
FIG. 1 is a perspective view of an improved device for converting the movement of a vibratory structure into rotary motion, in accordance with this invention.

Referring to FIG. 1, a spool-shaped shaft member 10 is mounted on a shaft 12 which is journaled for rotation in a fixed structure 14. Shaft 10 is a permanent magnet, with the rims 16, 18 thereof being opposite magnetic poles, as indicated. A blade member 20 is fixed at one end to a structure 22 which is subject to translatory movement at right angles to the axis of shaft 10, as indicated by arrow 24. The free end of blade 20 is sufficiently wide to contact the rims 16, 18 of shaft 10. Blade 20 is of magnetic material, whereby its free end is held against the poles (rims 16, 18) of shaft 10 by magnetic attraction to insure that, upon movement of structure 22, blade 20 rotates shaft 10 without slippage. Therefore, the angle through which shaft 10 rotates accurately represents the distance through which structure 22 moves.

Blade 20 may be of spring metal and arranged so that its free end is biased against shaft 10. Such spring action provides addititional insurance against relative movement between the parts. Where this effect is desired, blade 20 should be thin enough for the purpose, yet sufficiently thick to provide a strong magnetic path between the poles of shaft 10. In order to achieve the two effects, it may be advantageous to notch blade 20 near the fixed end thereof, as shown at 28, 30.

A short shaft extension 32 from shaft 10 supports one end of a pointer 34. As indicated by dotted lines at 34', pointer 34 moves through an angle, θ, corresponding to the distance d, through which blade 20 and structure 22 move. The relationship between the rectilinear movement of blade 20 and the angular movement of shaft 10 may be expressed as:

$$d = r\theta$$

where r is the radius of a rim of the shaft and θ is the angle in radians. Accordingly, the angular movement in degree is $$\theta = \frac{d}{r} \times \frac{180}{\pi}$$

Figure 2:
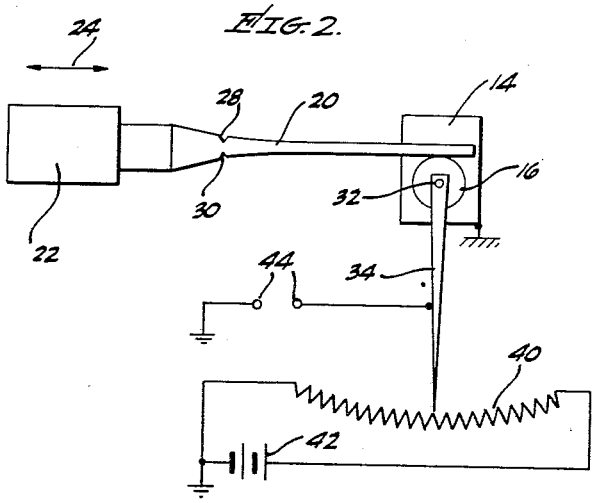
FIG. 2 is a side elevation view of the device of FIG. 1, illustrating schematically one arrangement to derive electrical signals representing the motion of the structure.

To illustrate the angular movements of pointer 34 for very small motions of structure 22, assume that structure 22 and blade 20 move through a distance d=0.01", and that the radius of the rim of shaft 10 is 0.1". From the foregoing equation, it will be seen that the angle through which shaft 10 moves is approximately 5.7°. The movement of pointer 34 magnifies this motion, and a sufficiently long pointer provides large movements which are easily measured to determine the extent of the motion of structure 22 with respect to the fixed structure 14. FIG. 2 illustrates one arrangement for obtaining an accurate measure of such movements.

Referring to FIG. 2, the end of pointer 34 is employed as a sliding contact for a potentiometer resistor 40, which preferably is curved to correspond to the arc through which the pointer moves. The ends of resistor 40 are connected to the positive and negative terminals of a D.-C. voltage source 42, the negative terminal of which is connected to a point of reference or ground potential. Output voltage terminals 44 are connected between pointer 34 and ground. Upon movement of pointer 34 in response to vibratory motions of structure 22 in the manner previously described, varying voltages are developed between output terminals 44 which accurately represent the deviations of pointer 34 from a reference position. Such voltages may be utilized in a desired manner, such as to provide a measure of the motion of structure 22 for test purposes, or to provide means to develop forces for damping the vibration of the structure.

Figure 3:
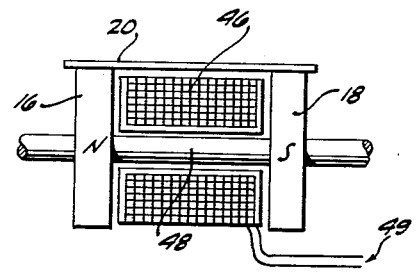
FIG. 3 is a sectional view illustrating a modification of a portion of the device of FIG. 1, further in accordance with this invention.

Although shaft 10 has been illustrated and described as a permanent magnet, it is noted that if a sufficiently large pinion can be tolerated, electromagnet means may be employed to establish the desired polarities at rims 16, 18. For this purpose, and as illustrated in FIG. 3, a coil 46 may be mounted about the shank portion 48 separating the rims 16, 18 and its leads 49 connected to a suitable source of voltage. It will also be recognized that this arrangement permits a measure of control, applying and preventing application of torque to shaft 10 and associated apparatus. For this purpose, blade 20 would not be spring biased against shaft 10, but would be adapted to slide over it in the absence of a magnetic field.

Referring again to FIG. 1, the attractive force between blade 20 and shaft 10 can be further augmented by making blade 20 a permanent magnet and arranging the poles thereof, as indicated, to effect greatest attraction between the contacting portions.

FIGS. 4 and 5 illustrate an improved altitude transducer employing a pair of spaced evacuated capsules or bellows 50, 52, located between parts 54, 56 of a structure 57. Shaft 10 is supported on the shaft 58 of the rotor of a synchro 60. Blade 20 is fixed at one end to one of the bellows 50, and a second and similar blade 20' is fixed at one end to the other bellows 52. The free ends of blades 20, 20' are separated by shaft 10, and are biased against and magnetically held to the shaft 10.

Since the bellows 50, 52 expand and contract in unison as the surrounding pressure varies, the blades 20, 20' move toward each other during expansion and away from each other during contraction of the bellows. Assuming the bellows to be of the same size and to have substantially equal characteristics, the blades are moved equal distances toward and away from each other, thereby avoiding any tendency to cause the pinion to be moved laterally. In this manner, the rotation of shaft 10 accurately follows the movements of the bellows 50, 52, and hence the variations in air pressure or altitude. Preferably, the structure 57 is made of a material suitable to prevent any lateral motion of pinion 10 due to differential expansion between the parts 54, 56 and blades 20, 20'.

Synchro 60 may be a conventional self-synchronous device of the type known as a synchro transmitter. The electrical output of synchro 60 is applied to a follower or receiver synchro 62. An amplifier 64 is coupled to the follower synchro 62, and a switch means, shown as a single-pole, double-throw switch 66, is adapted to apply the output of amplifier 64 to a motor 68 or to an autopilot system 70. A power source 72 supplies power to synchro 60 and motor 68.

As in the use of conventional synchros, the rotor winding of synchro 60 is electrically connected to power source 72, the rotor winding of synchro 62 is electrically coupled to amplifier 64, and the stator windings of the two synchros are directly connected to provide the output-input connections between them. Motor 68 may be a two-phase motor, in which case its reference winding (not shown) is connected to power source 72, and its control winding is connected to amplifier 64.

The magnitude of the error signals represents the degree of misalignment of the rotors, and the phase of such signal depends upon the direction of misalignment. Where switch 66 connects motor 68 to amplifier 64, this signal results in a rotation of the motor shaft 74 to turn the rotor of synchro 62 sufficiently to reduce the misalignment to zero.

Where the aircraft is changing altitude, the output of amplifier 64 may be switched to the autopilot system 70 at a desired altitude, whereupon any error signal applied to such system results in actuation of the elevators to align the aircraft for flight at that altitude.

The motion of the bellows is quite small, and therefore it is desirable that the diameter of shaft 10 be small. In one altitude transducer arrangement, a permanent magnet shaft of 0.1" radius was used with blades of soft magnetic iron. In such arrangement, a 0.0001" movement of blades 20, 20' resulted in an angular movement of shaft 10 of substantially 0.057°. Angular motions of this magnitude are readily detected by accurate error measuring systems, and this invention makes it possible to detect altitude changes of only a few feet.

It is noted that a variety of resistive or inductive pickoff means are suitable for use with this invention, and that the potentiometer of FIGS. 1 and 2 and synchro arrangement of FIGS. 4 and 5 are merely representative of the respective types.

Although shaft 10 has been shown with rims 16, 18 having cylindrical surfaces, many different surfaces of revolution for such parts are embraced by this invention. For example, the peripheries of the rims may be spherical, trapezoidal, conical, elliptical, or any one of the various types. The choice of peripheral surfaces for the rims depends upon the degree to which it is felt the magnetic flux passing between the rims and blades must be concentrated.

From the foregoing, it will be apparent that this invention provides a unique device of the rack and pinion type utilizing magnetism for accurately converting rectilinear motion, which is difficult to measure, into an easily detected and readily measurable rotary motion, without backlash.

What is claimed is:

1. Apparatus for measuring variations in air pressure comprising a structure having a pair of supports fixed with respect to movement relative to each other, a pair of bellows each having one side rigidly fixed to a respective support such that the free sides of said bellows face each other so that the axes of said bellows are approximately parallel, a pair of rectangular blade elements of magnetic material each having first and second ends and disposed between the pair of bellows, each blade element being fixed at its first end to a respective free side of said bellows and each second end being spaced apart from and extending beyond the other's second end such that each element has a surface facing a surface of the other element, a rotatable shaft positioned between the surfaces of said elements which extends beyond each other's second end, said shaft having spaced portions of opposite magnetic polarity to establish respective magnetic paths through said shaft and elements, whereby said second ends of said elements are held against said shaft by magnetic attraction, said bellows being adapted to expand and contract in unison upon changes in surrounding air pressure, thereby to move said elements longitudinally in opposite directions and effect rotation of said shaft through an angle corresponding to the movement of the bellows, and means operable by said shaft to develop electrical signals corresponding to the angular movement thereof.

2. The apparatus defined in claim 1, wherein said shaft is a spool-shaped permanent magnet with end portions having curved peripheral surfaces, said end portions being separated by a shank portion of reduced diameter, and wherein one end portion is of north polarity and the other end portion is of south polarity.

3. The apparatus defined in claim 1, wherein said shaft is a spool-shaped element of magnetizable material having rim portions of equal diameter separated by a shank portion of reduced diameter, and a coil surrounding said shank portion and adapted to be energized to establish opposite magnetic poles at said rim portions.

4. A device for providing relatively large indications of small movements of a structure comprising first and second substantially rectangular elements of magnetic spring material, said first element having first and second ends and being fixed at said first end to the structure, a spool-shaped shaft having first and second rim portions separated by a shank portion, said rim portions being of equal diameter and having peripheral surfaces corresponding to a predetermined surface of revolution, such diameter being short compared to the width of said elements, said spool-shaped shaft being positioned against one side of and near said second end of said first element, said elements being sufficiently wide to simultaneously contact the peripheral surfaces of both rim portions, said first rim portion being of north polarity and said second rim portion being of south polarity, whereby a magnetic path is established through said shaft and said second end of said first element and the free end of said first element is held against said rim portions and whereby said shaft rotates through a relatively large angle without slippage during movement of the structure, means operable by said shaft for measuring the angular movement thereof, said second element having first and second ends and being adapted for support at said first end to an oppositely disposed portion of the structure, one side near said second end of said second element being biased against both peripheral surfaces substantially diametrically opposite the free end of the first-mentioned rectangular element, and the portions of the structure to which said elements are fixed being subject to reciprocal movement through equal distances toward and away from each other.

References Cited in the file of this patent
UNITED STATES PATENTS

| | | |
|---|---|---|
| 398,926 | Balet | Mar. 5, 1889 |
| 537,078 | Selden | April 9, 1895 |
| 1,246,426 | Herman | Nov. 13, 1917 |
| 2,167,641 | Dewan | Aug. 1, 1939 |
| 2,178,641 | Neumann | Nov. 7, 1939 |
| 2,406,181 | Wiegand | Aug. 20, 1946 |
| 2,487,438 | Gryce | Nov. 8, 1949 |
| 2,544,122 | Abbott | Mar. 6, 1951 |
| 2,798,191 | Brailsford | July 2, 1957 |
| 2,814,688 | Kutzler | Nov. 26, 1957 |

UNITED STATES PATENT OFFICE
CERTIFICATE OF CORRECTION

Patent No. 3,015,956                            January 9, 1962

Harry N. Eklund

It is hereby certified that error appears in the above numbered patent requiring correction and that the said Letters Patent should read as corrected below.

Column 3, lines 3, 35, and 40, for "pinion", each occurrence, read -- shaft --.

Signed and sealed this 29th day of May 1962.

(SEAL)
Attest:

ERNEST W. SWIDER
Attesting Officer

DAVID L. LADD
Commissioner of Patents